United States Patent
Juri et al.

(10) Patent No.: US 8,135,060 B2
(45) Date of Patent: Mar. 13, 2012

(54) PICTURE CODING APPARATUS

(75) Inventors: Tatsuro Juri, Osaka (JP); Hiroshi Arakawa, Nara (JP); Katsuo Saigo, Hyogo (JP); Hideyuki Ohgose, Osaka (JP); Koji Arimura, Osaka (JP); Kei Tasaka, Nara (JP); Yuki Maruyama, Osaka (JP)

(73) Assignee: Panasonic Corporation, Osaka (JP)

( * ) Notice: Subject to any disclaimer, the term of this patent is extended or adjusted under 35 U.S.C. 154(b) by 1070 days.

(21) Appl. No.: 11/947,087

(22) Filed: Nov. 29, 2007

(65) Prior Publication Data

US 2009/0010322 A1 Jan. 8, 2009

(30) Foreign Application Priority Data

Nov. 30, 2006 (JP) ................... 2006-324611

(51) Int. Cl.
*H04N 7/12* (2006.01)
(52) U.S. Cl. .................................. 375/240.01
(58) Field of Classification Search ............. 375/240.01, 375/240.02, 240.12, 240.23
See application file for complete search history.

(56) References Cited

U.S. PATENT DOCUMENTS

| | | | |
|---|---|---|---|
| 5,748,249 A | 5/1998 | Fujiwara | |
| 5,790,745 A * | 8/1998 | Sugiyama et al. | 386/329 |
| 5,946,040 A * | 8/1999 | Kato et al. | 375/240.15 |
| 6,072,835 A | 6/2000 | Fujiwara | |
| 6,256,344 B1 | 7/2001 | Niihara | |
| 6,480,234 B1 * | 11/2002 | Sasaki et al. | 348/512 |
| 6,507,615 B1 * | 1/2003 | Tsujii et al. | 375/240.04 |
| 7,782,942 B2 | 8/2010 | Tsukuda | |
| 7,876,819 B2 * | 1/2011 | Wang et al. | 375/240.03 |
| 7,978,765 B2 * | 7/2011 | Conklin | 375/240.03 |
| 2004/0141732 A1 * | 7/2004 | Sugiyama | 386/111 |
| 2006/0050786 A1 * | 3/2006 | Tanizawa et al. | 375/240.03 |
| 2007/0140340 A1 | 6/2007 | Tsukuda | |

FOREIGN PATENT DOCUMENTS

| | | |
|---|---|---|
| JP | 8-18960 | 1/1996 |
| JP | 10-336679 | 12/1998 |
| JP | 11-313322 | 11/1999 |
| JP | 2006-080925 | 3/2006 |
| JP | 2007-166416 | 6/2007 |

* cited by examiner

*Primary Examiner* — Ricky Ngo
*Assistant Examiner* — Christine Ng
(74) *Attorney, Agent, or Firm* — Wenderoth, Lind & Ponack, L.L.P.

(57) ABSTRACT

A picture coding apparatus, optimizing a data amount of coded picture data without entailing an increase in circuit size and/or power consumption, includes a picture input unit obtaining a moving picture signal Vin. Further, the picture coding apparatus includes a buffer, includes a lead detecting unit detecting a lead portion from the moving picture represented by the moving picture signal Vin, includes a coding unit coding the moving picture signal Vin in the lead portion detected by the lead detecting unit, according to a coding condition for temporary coding, and includes a coding condition generating unit generating a coding condition for actual coding, based on the result of the coding by the coding unit and the coding condition for temporary coding. Additionally, coding unit codes the moving picture signal Vin representing the moving picture including the aforementioned lead portion, according to the coding condition for actual coding.

4 Claims, 5 Drawing Sheets

PICTURE CODING APPARATUS

BACKGROUND OF THE INVENTION (1) Field of the Invention

The present invention relates to a picture coding apparatus which codes a moving picture.

(2) Description of the Related Art

In recent years, there has been a transition in the recording medium for digital movie products, from tape recording media to Digital Versatile Disks (DVDs) and flash memories that have relatively small capacity. As such, in order to secure sufficient recording time, picture coding of higher compression rates, such as MPEG-2 and H.264, are being used.

FIG. 1 is an explanatory diagram showing the picture coding operation in MPEG-2, H.264, and so on. Here, a picture is one frame or one field of an inputted moving picture. In the coding in MPEG-2, H.264, and so on, in order to increase efficiency in coding, there is a function which refers to a picture other than the current picture to be coded, and codes the differential value between the current picture and the picture that is referred to. Here, a picture coded using only the data of the picture to be coded itself is called an I-picture; a picture coded by referring only to a picture that is inputted temporally ahead is called a P-picture, and a picture coded by referring to a picture that is inputted temporally ahead or after is called a B-picture. Note that in FIG. 1, these pictures are shown with "I" being affixed to an I-picture, "P" being affixed to a P-picture, and "B" being affixed to a B-picture. Furthermore, a B-picture refers to an I-picture or a P-picture immediately ahead in picture input order as well as an I-picture or a P-picture immediately after in input order.

In the case of coding a B-picture, since the temporally immediately subsequent I-picture or P-picture needs to be already coded, the order of the pictures to be coded is different from the order in which the pictures are inputted. (a) in FIG. 1 shows the order in which pictures are inputted; and (b) in FIG. 1 shows the order in which the pictures are coded. As in the figure, in order to code the first B-picture with input number 1, the preceding I-picture with input number 0 and the temporally subsequent P-picture with input number 3 need to be already coded. As such, after the coding of the first P-picture, the coding of an inputted picture is delayed by the time taken in rearranging the coding order.

Now, in MPEG-2, H.264, and so on, the data amount after the coding of each picture varies significantly according to the picture quality of the inputted picture. As such, in order to secure a certain amount of recording time, there is a need to control the data amount for each picture. In picture coding, in order to reduce the data amount after coding, a process is performed in which data accuracy is reduced by a data rounding-off process called quantization in the coding stage. However, when the accuracy in quantization is reduced significantly, the picture quality of the coded picture also deteriorates. As such, it is required that the quantization accuracy is increased and picture quality deterioration minimized as much as possible, within the required data amount.

Consequently, as a method of controlling the data amount, a method and a picture coding apparatus are being considered, in which all inputted pictures are coded once and, a coding condition for a quantization accuracy, and so on, which attains an optimal data amount is determined using the coding result, and coding is performed again using the result (see for example, Japanese Unexamined Patent Application Publication No. 8-18960).

However, in the picture coding apparatus in the aforementioned Patent Reference 1, since the data amount of coded picture data is optimized, there is the problem that circuit size and power consumption significantly increase.

In other words, in the picture coding apparatus in the aforementioned Patent Reference 1, since coding is performed in two iterations for all pictures, the size of the processing circuit needed for coding becomes twice that of normal, and the processing capacity for calculation needed for coding becomes twice that of normal. In addition, since the circuit size for normal coding is large, when that size is doubled, power consumption is also increased together with incurring a significant increase in cost.

SUMMARY OF THE INVENTION

Consequently, the present invention is conceived in view of the aforementioned problem and has as an object to provide a picture coding apparatus which optimizes the data amount of coded picture data without incurring increases in circuit size and power consumption.

In order to achieve the aforementioned object, the picture coding apparatus according to the present invention is a picture coding apparatus which codes a moving picture signal, the picture coding apparatus including: a moving picture obtaining unit which obtains the moving picture signal; a lead detecting unit which detects a lead portion of the moving picture signal; a temporary coding unit which codes the lead portion of the moving picture signal detected by the lead detecting unit, according to a first coding condition; a coding condition generating unit which generates a second coding condition, based on a result of the coding by the temporary coding unit and the first coding condition; and an actual coding unit which codes the moving picture signal including the lead portion, according to the second coding condition generated by the coding condition generating unit.

With this, since the second coding condition, which is suited to the moving picture signal is generated based on the result of the coding performed on the lead portion of the moving picture signal, and the moving picture signal is again coded from the lead portion, according to the second coding condition, the data amount of the moving picture signal to be coded can always be optimized from the start, and picture quality can be stabilized. In addition, since only the lead portion of the moving picture signal is coded again by the actual coding unit, it is possible to prevent an increase in circuit size and/or power consumption in the memory and/or arithmetic circuit, compared to when the whole of the moving picture signal is coded again.

Furthermore, it is also possible that the moving picture obtaining unit obtains the moving picture signal which is made up of pictures, by sequentially obtaining each of the pictures, the temporary coding unit codes pictures included in the lead portion of the moving picture signal by performing orthogonal transformation and quantization on the pictures, and the actual coding unit codes the pictures included in the moving picture signal by performing orthogonal transformation, quantization, and variable-length coding on the pictures.

With this, since the temporary coding unit does not perform variable-length coding and variable-length coding is performed only by the actual coding unit, coding can be performed in a short time. In other words, in the case of performing picture coding which complies with the H.264 Standard, variable-length coding such as arithmetic coding, becomes necessary. Furthermore, variable-length coding requires a long processing time. Therefore, when the variable-length coding by the temporary coding unit is also performed aside from the coding by the actual coding unit, the time needed for overall coding becomes exceedingly long. However, since variable-length coding is not performed in the coding by the temporary coding unit in the present invention, the overall coding process can be performed in a short time.

Furthermore, it is also possible that the moving picture obtaining unit obtains the moving picture signal which is made up of pictures, by sequentially obtaining each of the pictures, the actual coding unit codes the pictures in an order that is different from an order in which the moving picture obtaining unit obtains the pictures, and the temporary coding unit codes the pictures included in the lead portion, in a period in which the actual coding unit is not coding the pictures obtained by the moving picture obtaining unit. For example, the temporary coding unit codes the pictures included in the lead portion, in a period between: a timing at which a third picture is obtained by the moving picture obtaining unit, which is after a first picture is obtained by the moving picture obtaining unit and before a second picture is obtained by the moving picture obtaining unit; and a timing at which the second picture is coded by the actual coding unit, the third picture being coded by the actual coding unit by referring to the first picture and the second picture.

With this, since the coding (temporary coding) by the temporary coding unit is executed in the period in which the coding (actual coding) by the actual coding unit is not executed, it is possible to configure the temporary coding unit and the actual coding unit with a single coding circuit, and execute temporary coding and actual coding can be executed by switching from one to the other in the coding circuit. As a result, an increase in circuit size can be further suppressed. In addition, even when the coding by the temporary coding unit is performed, an increase in the time required for the overall coding process can be suppressed.

For example, the respective pictures obtained by the picture obtaining unit are actually coded, from the lead picture, as an I-picture, a B-picture, a B-picture, and a B-picture, in the order in which they are obtained. In such a case, although there is time to code three pictures in the period between the timing at which the moving picture obtaining unit obtains the second B-picture (the third picture) which is coded by referring to an I-picture and P-picture (the first and second pictures), the actual coding unit can only code the lead I-picture. In other words, even when the pictures are obtained by the moving picture obtaining picture in the order of an I-picture, B-picture, B-picture, and P-picture, since the actual coding unit codes the pictures in the order of an I-picture, P-picture, B-picture, and B-picture, the actual coding unit is only able to code the I-picture, as described above. As a result, vacant time arises in the coding by the actual coding unit. Through the coding of the I-picture and the second B-picture by the temporary coding unit using such vacant time, an increase in the time needed for the overall coding can be suppressed.

Note that the present invention can be implemented, not only as such a picture coding apparatus, but also as a method and/or program thereof, a recording medium on which such program is stored, and an integrated circuit.

The picture coding apparatus of the present invention produces the effect of being able to optimize the data amount of coded picture data without entailing an increase in circuit size and/or power consumption.

FURTHER INFORMATION ABOUT TECHNICAL BACKGROUND TO THIS APPLICATION

The disclosure of Japanese Patent Application No. 2006-324611 filed on Nov. 30, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENT(S)

Hereinafter, the embodiment of the present invention shall be described with reference to the drawings.

Figure 2:
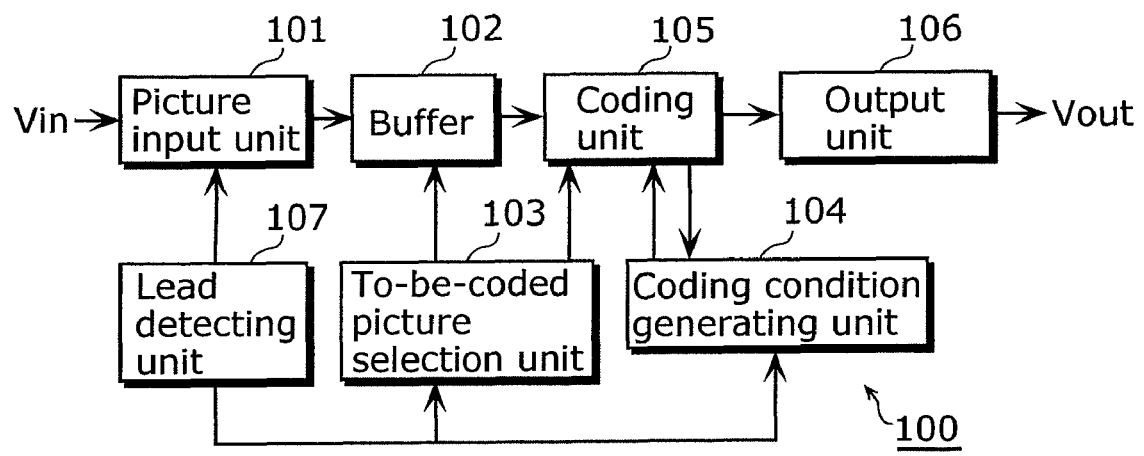
FIG. 2 is a block diagram showing the configuration of the picture coding apparatus according to the embodiment of the present invention.

FIG. 2 is a block diagram showing the configuration of the picture coding apparatus according to the embodiment of the present invention.

A picture coding apparatus 100 in the present embodiment optimizes the data amount of coded picture data so as to prevent the increase of circuit size and power consumption. The picture coding apparatus 100 generates a moving picture coded signal Vout by obtaining and coding a moving picture signal Vin representing a moving picture, and outputs the moving picture coded signal Vout. Note that the moving picture signal Vin is structured by including plural pictures, with a picture representing one frame or one field.

The picture coding apparatus 100 includes a picture input unit 101, a buffer 102, a to-be-coded picture selecting unit 103, a coding condition generating unit 104, a coding unit 105, an output unit 106, and a lead detecting unit 107.

The picture input unit 101, upon receiving a recording start instruction from a user for example, obtains a moving picture signal Vin and stores it in the buffer 102. Here, the picture input unit 101 sequentially obtains pictures included in the moving picture signal Vin, and every time a picture is obtained, stores that picture in the buffer 102. Note that in the present embodiment, the picture input unit 101 and the buffer 102 are configured as a moving picture obtaining unit.

The lead detecting unit 107 detects the leading picture in the moving picture signal Vin obtained by the picture input unit 101, and notifies the detection of the lead picture to the to-be-coded picture selecting unit 103 and the coding condition generating unit 104.

The to-be-coded picture selecting unit 103 selects, one by one, the picture to be coded (current picture to be coded) from among the pictures stored in the buffer 102, and notifies the coding unit 105 of the current picture to be coded. Such selecting of a current picture to be coded is performed, for example, at the timing at which the picture is stored in the buffer 102.

Here, the to-be-coded picture selecting unit 103 selects plural pictures at the lead portion of the moving picture signal Vin, including the lead picture, as respective current pictures to be temporarily coded, and selects all the pictures included in the moving picture signal Vin as respective current pictures to be actually coded.

For example, when a lead picture is detected by the lead detecting unit 107, the to-be-coded picture selecting unit 103 identifies the reference relationship of the pictures sequentially stored in the buffer 102, and determines the order of pictures to be selected as current pictures to be actually coded, or in other words, the actual order for coding (hereafter called actual coding order).

The actual coding order determined in this manner is different to the order in which the pictures are obtained by the picture input unit 101 and stored in the buffer 102 (hereinafter called input order). As a result, at the timing at which the pictures are sequentially stored in the buffer 102, in the case where the timing for selecting the first current picture to be actually coded is delayed to enable successive selection of current pictures to be actually coded, even when the succeeding picture is sequentially stored in the buffer 102 after the lead picture is stored in the buffer 102, there arises a period (actual coding waiting period) in which the picture stored in the buffer 102 is not selected as a current picture to be actually coded.

Consequently, the to-be-coded picture selecting unit 103 in the present embodiment identifies this actual coding waiting period and, during this actual coding waiting period, selects the pictures already stored in the buffer 102 as respective current pictures to be temporarily coded. At this time, the to-be-coded picture selecting unit 103 selects respective current pictures to be temporarily coded in the order in which they are stored in the buffer 102.

The coding condition generating unit 104 generates a coding condition for the pictures in the moving picture signal Vin. Here, when the lead picture is detected by the lead detecting unit 107, the coding condition generating unit 104 generates a coding condition for temporary coding. For example, the coding condition generating unit 104 pre-records, in a recording medium, the coding condition applied to a moving picture signal Vin coded in the past by the picture coding apparatus 100. Then, upon receiving the notice about the lead picture, the coding condition generating unit 104 reads the coding condition from the recording medium thereby generating the read coding condition as the coding condition for temporary coding.

In addition, upon obtaining from the coding unit 105 coding information obtained through the coding of the current pictures to be temporarily coded, the coding condition unit 104 modifies the coding condition for temporary coding based on the coding information so as to generate the coding condition for actual coding. Subsequently, the coding condition generating unit 104 outputs the coding condition for actual coding to the coding unit 105.

The coding unit 105 reads the current picture to be coded selected by the to-be-coded picture selecting unit 103 from the buffer 102, and obtains the coding condition generated and outputted by the coding condition generating unit 104. Then, the coding unit 105 codes the read current picture according to the coding condition outputted by the coding condition generating unit 104, thereby generating coded data representing the result of the coding, and outputs the coded data to the output unit 106.

In other words, when the current picture to be temporarily coded is selected by the to-be-coded picture selecting unit 103, the coding unit 105 codes (temporary coding) the current picture to be temporarily coded according to the coding condition for temporary coding, and generates coded data. Subsequently, the coding unit 105 generates the aforementioned coding information indicating the data amount for the coding, and outputs the coding information to the coding condition generating unit 104. Note that when the current picture to be temporarily coded is selected, the coding unit 105 does not output, to the output unit 106, the coded data generated by the coding of such current picture to be temporarily coded.

In addition, when the current picture to be actually coded is selected by the to-be-coded picture selecting unit 103, the coding unit 105 codes (actual coding) the current picture to be actually coded according to the reference relationship identified by the to-be-coded picture selecting unit 103 and the coding condition for actual coding.

In this manner, in the present embodiment, the coding unit 105 is configured as a temporary coding unit and an actual coding unit.

Note that the plural pictures stored in the buffer 102 are selected as current pictures to be temporarily coded as well as being selected as current pictures to be actually coded. In such case where temporary coding and actual coding are to be performed on plural pictures, the coding unit 105 makes different the reference relationships of the plural pictures during temporary coding and the reference relationships of the plural pictures during actual coding.

Upon obtaining the coded data from the coding unit 105, the output 106 performs, on the coded data, processing according to the output destination of the coded data, and outputs the processed coded data as the moving picture coded signal Vout which is the coded picture data.

Here, as the coding information outputted from the coding unit 105 to the coding condition generating unit 104, it is possible to use various information such as, for example, quantization information during coding, the data amount after coding, a motion vector for a reference picture, the differential signal between a current picture to be temporarily coded and the reference picture, and so on. Furthermore, as the coding condition for temporary coding or actual coding, it is possible to use various conditions such as the initial value of quantization information, the choice of coding modes, and so on.

More specifically, the coding unit 105 outputs coding information indicating the data amount or picture quality of coded data. In this case, when the data amount is greater than a predetermined threshold, or when the picture quality is exceedingly better than a predetermined picture quality, the coding condition generating unit 104 generates a coding condition for actual coding which indicates a larger quantization step than the quantization step indicated by the coding condition for temporary coding. As a result, when coding the current picture to be actually coded according to such coding condition for actual coding, the coding unit 105 is able to keep the data amount of the coded data equal to or less than the predetermined threshold and keep the picture quality of the coded data to an appropriate level. On the contrary, when the data amount is less than the predetermined threshold, or when the picture quality is poorer than the predetermined picture quality, the coding condition generating unit 104 generates a coding condition for actual coding which indicates a smaller quantization step than the quantization step indicated by the coding condition for temporary coding. As a result, when coding the current picture to be actually coded according to such coding condition for actual coding, the coding unit 105 is able to make the data amount of the coded data equal to or greater than the predetermined threshold and improve the picture quality represented by the coded data.

Furthermore, when the data amount is greater than the predetermined threshold, or when the picture quality is exceedingly better than the predetermined picture quality, the coding condition generating unit 104 generates a coding condition for actual coding which indicates inter-picture coding, for intra-picture coding indicated by the coding condition for temporary coding. As a result, when coding the current picture to be actually coded according to such coding condition for actual coding, the coding unit 105 is able to keep the data amount of the coded data equal to or lower than the predetermined threshold and keep the picture quality of the coded data to an appropriate level. On the contrary, when the data amount is less than the predetermined threshold, or when the picture quality is poorer than the predetermined picture quality, the coding condition generating unit 104 generates a coding condition for actual coding which indicates intra-picture coding, for inter-picture coding indicated by the coding condition for temporary coding. As a result, when coding the current picture to be actually coded according to such coding condition for actual coding, the coding unit 105 is able to make the data amount of the coded data equal to or greater than the predetermined threshold and improve the picture quality represented by the coded data.

Furthermore, when the data amount is greater than the predetermined threshold, or when the picture quality is exceedingly better than the predetermined picture quality, the coding condition generating unit 104 generates a coding condition for actual coding which indicates a quantization matrix in which the coefficient of the quantization value of the high-band becomes smaller than the quantization matrix indicated by the coding condition for temporary coding. As a result, when coding the current picture to be actually coded according to such coding condition for actual coding, the coding unit 105 is able to keep the data amount of the coded data equal to or lower than the predetermined threshold and keep the picture quality of the coded data to an appropriate level. On the contrary, when the data amount is less than the predetermined threshold, or when the picture quality is poorer than the predetermined picture quality, the coding condition generating unit 104 generates a coding condition for actual coding which indicates a quantization matrix in which the coefficient of the quantization value of the high-band becomes larger than the quantization matrix indicated by the coding condition for temporary coding. As a result, when coding the current picture to be actually coded according to such coding condition for actual coding, the coding unit 105 is able to make the data amount of the coded data equal to or greater than the predetermined threshold and improve the picture quality represented by the coded data.

Figure 3:
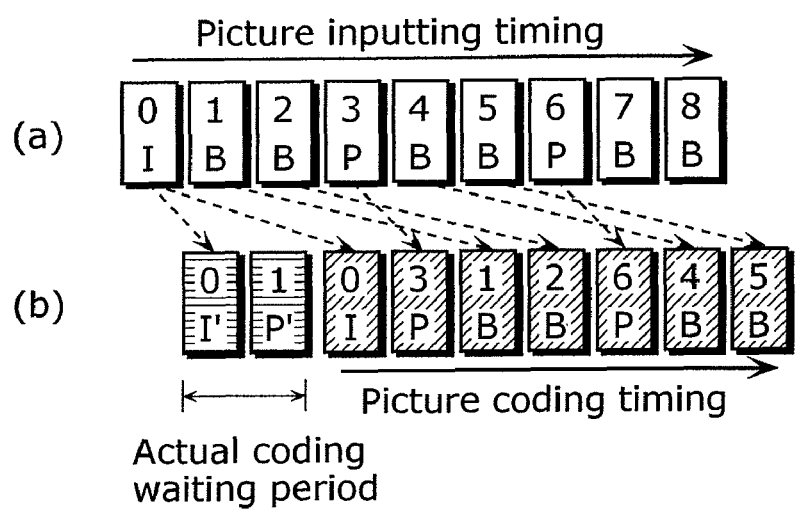
FIG. 3 is an explanatory diagram for describing an example of the temporary coding and actual coding by the picture coding apparatus of the present invention.

FIG. 3 is an explanatory diagram for describing an example of the temporary coding and actual coding by the picture coding apparatus 100 in the present embodiment. Note that in FIG. 3, the pictures are shown with "I" being affixed to an I-picture, "P" being affixed to a P-picture, and "B" being affixed to a B-picture. In addition, in FIG. 3, the input order of each picture is shown by affixing numbers "0, 1, 2, 3, . . . " to the respective pictures.

Figure 1:
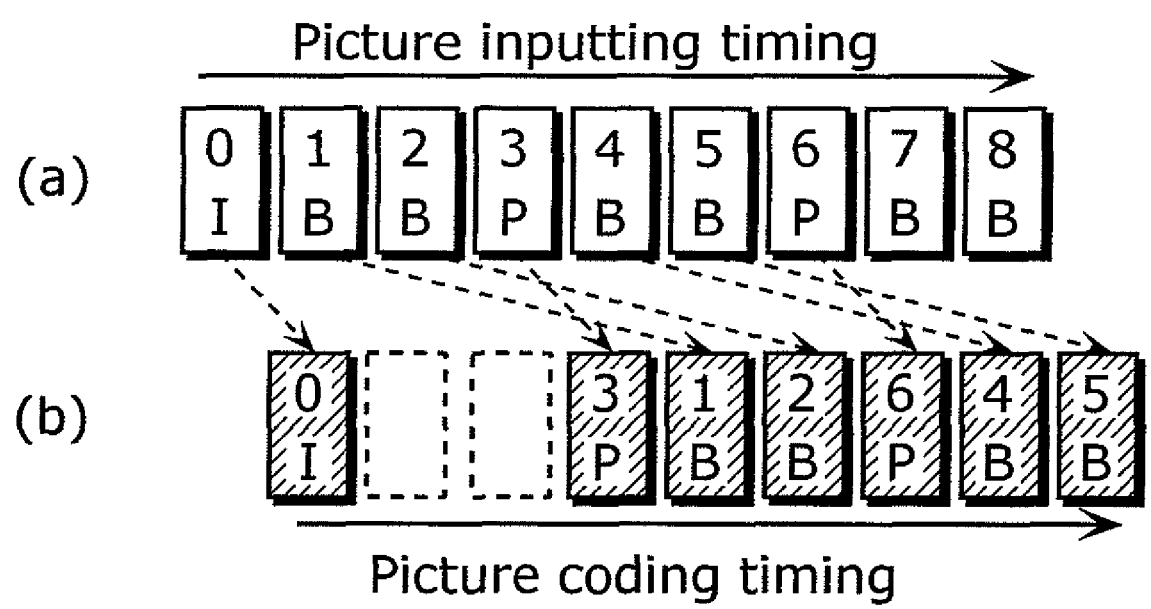
FIG. 1 is an explanatory diagram showing the timing of the operation of a conventional picture coding apparatus.

As described using FIG. 1, since coding is performed using a B-picture, a discrepancy occurs between the timing at which a picture is inputted (stored) in the buffer 102, and the timing at which that picture is coded. As a result, coding cannot be performed for the period required to code approximately two pictures.

Given this factor, the picture coding apparatus 100 in the present embodiment uses the coding period for the first two pictures to perform temporary coding on the leading inputted I-picture and the B-picture inputted second (input order=1), as shown in FIG. 3. In other words, the to-be-coded picture selecting unit 103 in the present embodiment identifies the above-described actual coding waiting period and, during this actual coding waiting period, sequentially selects the leading I-picture and the second B-picture that are already stored in the buffer 102 as current pictures to be temporarily coded.

To be more specific, as shown in (a) in FIG. 3, the to-be-coded picture selecting unit 103 identifies a reference relationship for actual coding in which pictures sequentially stored (inputted) in the buffer 102 are, in input order, an "I-picture, B-picture, B-picture, P-picture, B-picture, B-picture, P-picture, . . . ". Then, the to-be-coded picture selecting unit 103 identifies the actual coding waiting period, as shown in (b) in FIG. 3. In other words, the to-be-coded picture selecting unit 103 finds out the period between: the timing at which the B-picture having input order=0, that is actually coded by referring to the I-picture having input order=0 and the P-picture having input order=3, is stored in the buffer 102 which is after such I-picture is stored in the buffer 102 and before such P-picture is stored in the buffer 102; and the timing at which the P-picture is actually coded. Then, the to-be-coded picture selecting unit 103 identifies the actual coding waiting period by deducting, from such period, the period in which the I-picture can be actually coded.

Subsequently, at the timing in which a picture is stored in the buffer 102 during the actual coding waiting period, the to-be-coded picture selecting unit 103 selects, in input order, pictures already stored in the buffer 102 as respective current pictures to be temporarily coded, for example. In other words, to-be-coded picture selecting unit 103 selects the leading (input order=0) I-picture stored in the buffer 102 as the first current picture to be temporarily coded, and selects the second (input order=1) B-picture inputted subsequently as the second current picture to be temporarily coded. When the first and second current pictures to be temporarily coded are selected in such manner, the coding unit 105 temporarily codes the first current picture to be temporarily coded as an I-picture (picture shown by the affixed I' in FIG. 3) and then temporarily codes the second current picture as a P-picture which refers to the first current picture to be temporarily coded (picture shown by the affixed P' in FIG. 3).

In this manner, the coding unit 105 temporarily codes the B-picture that is inputted second (input order=1), as a P-picture which refers to the leading I-picture. In other words, when temporarily coding the picture having input order=1, the coding unit 105 temporarily codes the picture as a P-picture without referring to the picture having input order=3 (P-picture) to be referenced during actual coding of such picture. In short, although the coding unit 105 performs temporary coding and actual coding on the pictures that are stored first and second in the buffer 102 (pictures having input order=0 and 1), differentiates the reference relationships of the pictures during temporary coding and the reference relationships of the pictures during actual coding.

In the present embodiment, by performing such temporary coding, in other words by coding the first I-picture and P-picture, an optimal coding condition can be generated.

Note that although in the above-described example the reference relationship is changed and a B-picture is temporarily lo coded as a P-picture, since the coding process of a B-picture is similar to the coding process of a P-picture, the optimal coding condition can be generated even with such temporary coding.

Figure 4:
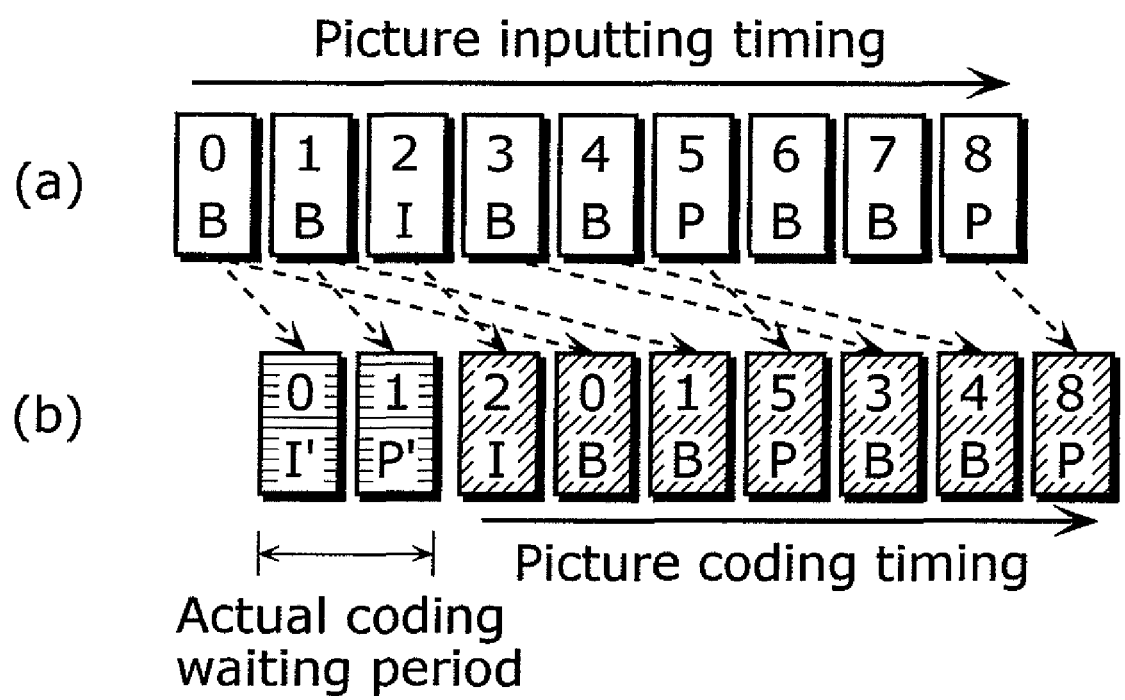
FIG. 4 is an explanatory diagram for describing another example of the temporary coding and actual coding by the picture coding apparatus of the present invention.

FIG. 4 is an explanatory diagram for describing another example of the temporary coding and actual coding by the picture coding apparatus 100 in the present embodiment. Note that in FIG. 4, the pictures are shown with "I" being affixed to an I-picture, "P" being affixed to a P-picture, and "B" being affixed to a B-picture. In addition, in FIG. 4, the input order of each picture is shown by affixing numbers "0, 1, 2, 3, . . . " to the respective pictures.

As shown in FIG. 4, the to-be-coded picture selecting unit 103 identifies a reference relationship for actual coding in which pictures sequentially stored (inputted) in the buffer 102 are, in input order, an "B-picture, B-picture, I-picture, B-picture, B-picture, P-picture, B-picture, . . . ".

Subsequently, as shown in (b) in FIG. 4, when identifying the actual coding waiting period, the to-be-coded picture selecting unit 103 selects, for example, at the timing in which a picture is stored in the buffer 102 during the actual coding waiting period, pictures already stored in the buffer 102 in input order, as respective current pictures to be temporarily coded. In other words, the to-be-coded picture selecting unit 103 selects the leading (input order=0) B-picture stored in the buffer 102 as the first current picture to be temporarily coded, and selects the second (input order=1) B-picture inputted subsequently as the second current picture to be temporarily coded. When the first and second current pictures to be temporarily coded are selected in such manner, the coding unit 105 temporarily codes the first current picture to be temporarily coded as an I-picture (picture shown by the affixed I' in FIG. 4) and then temporarily codes the second current picture as a P-picture which refers to the first current picture to be temporarily coded (picture shown by the affixed P' in FIG. 4).

In this manner, in the present embodiment, when the first (input order=0) and second (input order=1) pictures to be inputted are B-pictures, the B-picture that is inputted first is temporarily coded as an I-picture, and the B-picture that is inputted second is coded as a P-picture which refers to the leading picture. In other words, when temporarily coding the picture having input order=1, the coding unit 105 temporarily codes the picture as a P-picture by referring to the picture having input order=0 (B-picture) which is not to be referenced during actual coding of such picture.

Even in such case, in the present embodiment, the optimal coding condition can be generated by coding pictures near the lead, and optimal coding becomes possible, as in the example in FIG. 3.

Note that although the temporary coding and actual coding in the present embodiment is described by exemplifying the two cases shown in FIG. 3 and FIG. 4, the present invention is not limited to such cases, and can perform various temporary coding and actual coding aside from these cases.

Figure 5:
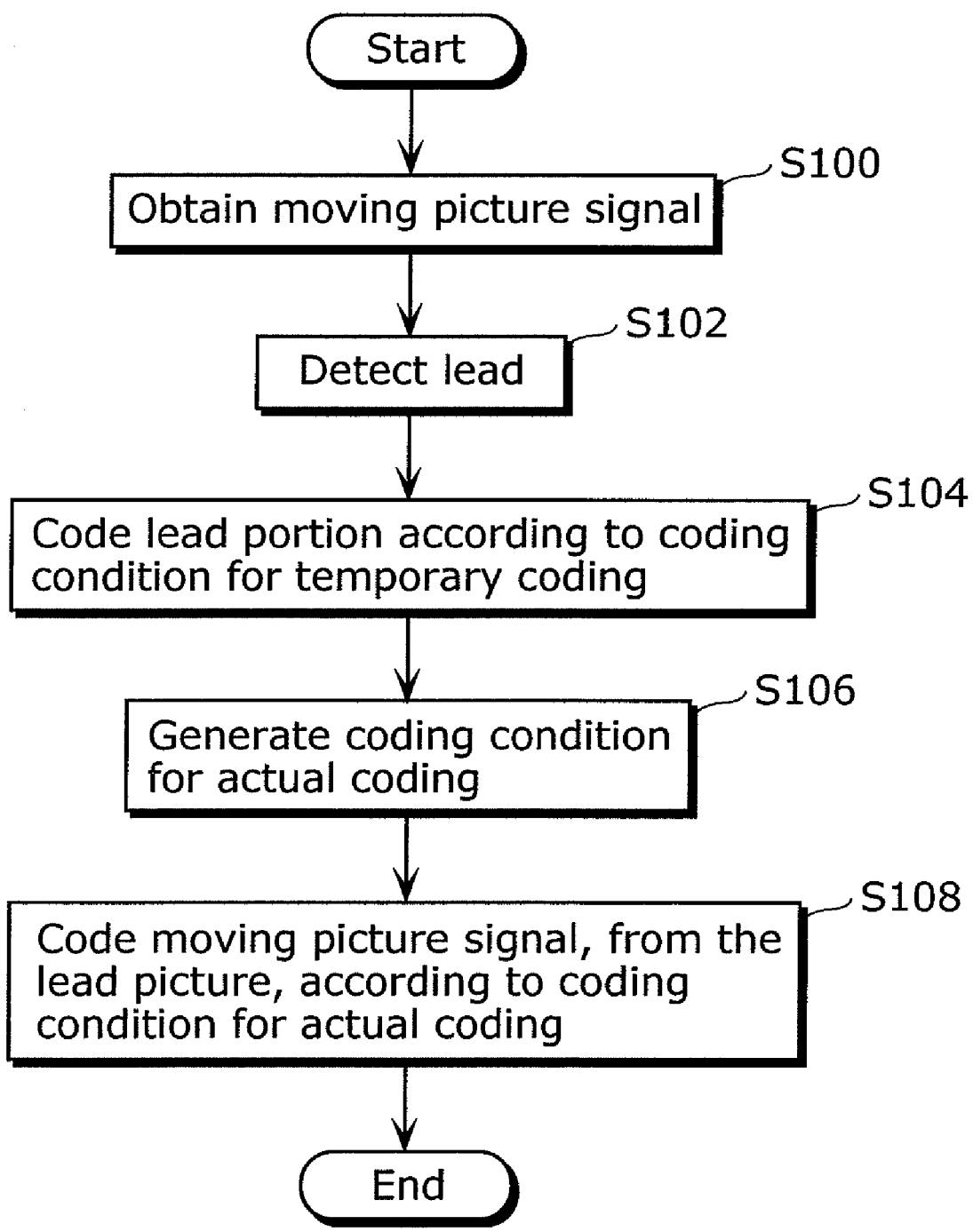
FIG. 5 is a flowchart showing the operation of the picture coding apparatus of the present invention.

FIG. 5 is a flowchart showing the operation of the picture coding apparatus 100 in the present embodiment.

First, the picture coding apparatus 100 obtains the moving picture signal Vin (step S100), and detects the lead picture of the moving picture signal Vin (step S102). Subsequently, the picture coding apparatus 100 temporarily codes, according to the coding condition for temporary coding, the lead portion, that is, the plural pictures including the lead picture in accordance with the actual coding waiting time of the moving picture signal Vin (step S104).

Next, the picture coding apparatus 100 generates a coding condition for actual coding, based on coding information obtained by the temporary coding in step S104 (step S106). Subsequently, the picture coding apparatus 100 actually codes, according to the coding condition for actual coding, the plural pictures from the lead picture that are included the moving picture signal Vin (step S108).

As described thus far, in the present embodiment, the optimal coding condition can be generated by coding pictures near the lead, and optimal coding becomes possible. Furthermore, in the present embodiment, since temporary coding is performed, as shown in FIG. 3, making use of the period in which the coding shown in FIG. 1 is not possible, there is no need to provide a special coding circuit for temporary coding, and implementation is possible with the normal coding circuit. Furthermore, since it is sufficient to perform temporary coding only on the pictures near the lead, the increase in the amount of processing is an insignificant amount in relation to the processing amount for the entire moving picture.

Therefore, with the present invention, since moving picture coding can be performed, from the beginning, always according to the optimal coding condition, practically without increasing circuit size, processing amount, and power consumption, it is possible to realize the best picture quality with the required data amount.

(Modification)

Hereinafter, a modification of the present embodiment shall be described.

Figure 6:
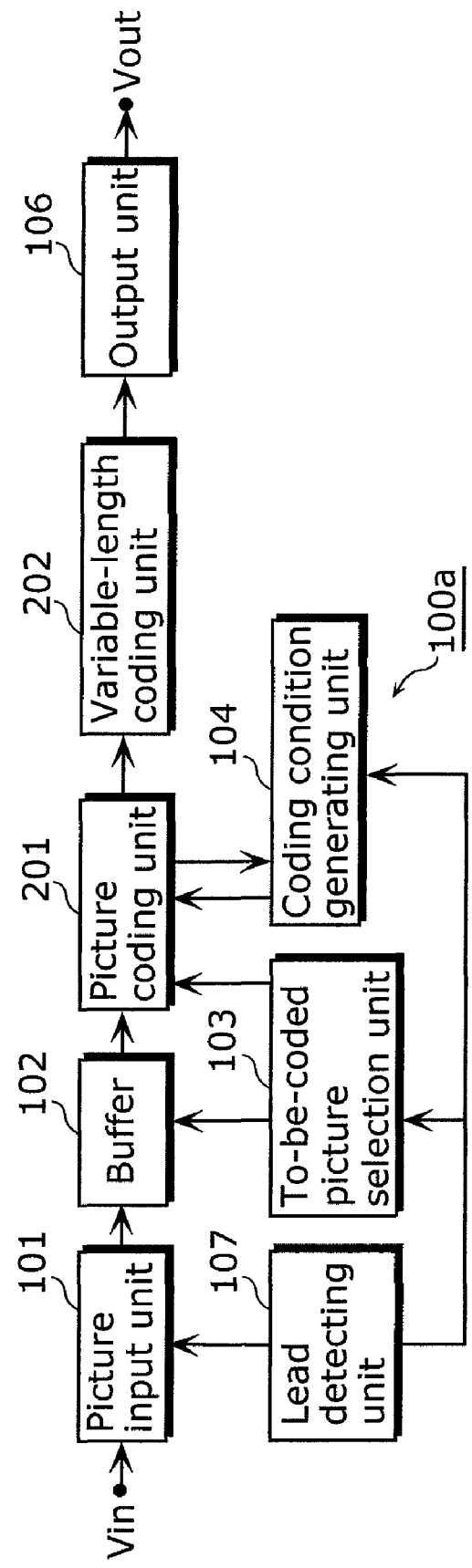
FIG. 6 is a block diagram showing the configuration of the picture coding apparatus according to a modification of the embodiment of the present invention.

FIG. 6 is a block diagram showing the configuration of the picture coding apparatus according to the present modification.

A picture coding apparatus 100a according to the present modification includes a picture input unit 101, a buffer 102, a to-be-coded picture selecting unit 103, a coding condition generating unit 104, a picture coding unit 201, a variable-length coding unit 202, an output unit 106, and a lead detecting unit 107. In other words, the picture coding apparatus 100a according to the present modification is an apparatus which performs picture coding in compliance to the H.264 Standard, and which includes the picture coding unit 201, and the variable-length coding unit 202, in place of the coding unit 105 in the picture coding apparatus 100 in the previously described embodiment.

The picture coding unit 201 according to the present modification performs, as coding, predictive differential generation, orthogonal transformation, quantization, and binarization, in compliance with the H.264 Standard, and outputs first encoded data representing the result of such coding.

Furthermore, the variable-length coding unit 202 according to the present modification obtains the first coded data outputted by the picture coding unit 201, performs variable-length coding, such as arithmetic coding, in compliance with the H.264 Standard on the first coded data, and outputs second coded data, representing the result of such arithmetic coding, to the output unit 106.

As in the previously described embodiment, upon obtaining the second coded data from the variable-length coding unit 202, the output 106 performs, on the second coded data, processing according to the output destination of the second coded data, and outputs the processed second coded data as a moving picture coded signal Vout which is coded picture data.

Note that in the present modification, the picture coding unit 201 is configured as a temporary coding unit, and the picture coding unit 201 and the variable-length coding unit 202 are configured as an actual coding unit.

To be more specific, the picture coding unit 201, like the coding unit 105, reads the current picture to be coded selected by the to-be-coded picture selecting unit 103 from the buffer 102, and obtains the coding condition generated and outputted by the coding condition generating unit 104. Then, the picture coding unit 201 codes the read current picture according to the coding condition outputted by the coding condition generating unit 104, thereby generating the first coded data representing the result of the coding, and outputs the first coded data to the output unit 106. Note that for the coding condition, a condition that is the same as that in the above-described embodiment is used.

In other words, when the current picture to be temporarily coded is selected by the to-be-coded picture selecting unit 103, the picture coding unit 201 codes (temporary coding) the current picture to be temporarily coded, according to the coding condition for temporary coding, so as to generate the first coded data. Subsequently, the picture coding unit 201 generates coding information indicating the data amount of the first coded data, and so on, and outputs the coding information to the coding condition generating unit 104.

Note that although the same information as in the previously described embodiment is used for the coding information, the picture coding unit 201 may estimate the data amount after the arithmetic coding by the variable-length coding unit 202 and generate such estimated data amount as the coding information. Note that when the current picture to be temporarily coded is selected, the picture coding unit 201 does not output, to the variable-length coding unit 202, the first coded data generated by the coding of such current picture to be temporarily coded.

In addition, when the current picture to be actually coded is selected by the to-be-coded picture selecting unit 103, the picture coding unit 201 codes (actual coding) the current picture to be actually coded, according to the reference relationship identified by the to-be-coded picture selecting unit 103 and the coding condition for actual coding.

Note that the plural pictures stored in the buffer 102 are selected as current pictures to be temporarily coded as well as being selected as current pictures to be actually coded. In such case where temporary coding and actual coding are to be performed on plural pictures, the picture coding unit 201 differentiates the reference relationships of the plural pictures during temporary coding and the reference relationships of the plural pictures during actual coding.

In the picture coding apparatus 100 according to such present modification, the first coded data for the current picture to be temporarily coded generated by the picture coding unit 201 is not outputted to the variable-length coding unit 202, and arithmetic coding is not performed on the first coded data. With this, in the present embodiment, aside from being able to obtain the same effect as in the previously described embodiment, by not executing exceedingly time-consuming variable-length coding, such as the H.264 arithmetic coding, in the temporary coding, the processing time for temporary coding can be reduced and the delay in overall coding due by temporary coding can be minimized.

Although the picture coding apparatus according to the present invention has been described thus far using the embodiment and a modification thereof, the present invention is not limited to such embodiments.

For example, although in the embodiment and modification thereof, the picture coding apparatus of the present invention assumes the configuration shown in FIG. 3 and FIG. 6, other configurations are also possible. In addition, the picture coding apparatus of the present invention may be configured with all or a part of the constituent elements shown in FIG. 3 and FIG. 6 except the buffer 102, as a semiconductor integrated circuit such as a Digital Signal processor (DSP), Large Scale Integration (LSI), or the like.

Furthermore, although in the embodiment and modification thereof, the coding condition for actual coding is generated based on coding information in the temporary coding, the coding condition for actual condition may be updated as needed, when actual coding is being performed by the coding unit 105 or the picture coding unit 201, based on the coding information in such actual coding. In this case, for example, in the same manner as when coding information is generated by temporary coding, the coding unit 105 generates coding information indicating the data amount of the coded data, by performing actual coding on the current picture to be actually coded, and outputs the coding information to the coding condition generating unit 104. Subsequently, the coding condition generating unit 104 modifies the coding condition for actual coding used until just before by the coding unit 105, based on the coding information. Subsequently, the coding condition generating unit 104 outputs the modified coding condition for actual coding to the coding unit 105. With this, the coding unit 105 replaces the coding condition for actual coding being used just before with the modified coding condition and, henceforth, codes the current picture for actual coding according to such modified coding condition.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The picture coding apparatus of the present invention produces the effect of being able to optimize the data amount of coded picture data without entailing an increase in circuit size and/or power consumption, and can be applied, for example, in a video camera, cellular phone, or the like.

What is claimed is:

1. A picture coding apparatus for coding a moving picture signal, said picture coding apparatus comprising:
   a moving picture obtaining unit configured to obtain the moving picture signal;
   a lead detecting unit configured to detect a lead portion of the moving picture signal;
   a first coding unit configured to perform actual coding of all of the obtained moving picture signal, so as to generate and output binary data, and configured to perform temporary coding of the detected lead portion of the moving picture signal extending up to the generation of the binary data;
   a second coding unit configured to perform at least variable-length coding on the binary data output from said first coding unit, so as to output variable coded binary data; and
   a coding condition generating unit configured to generate coding condition for the actual coding, the coding condition for the actual coding being generated based on a temporary coding condition used by said first coding unit to perform the temporary coding of the detected lead portion,
   wherein said first coding unit performs the temporary coding of the detected lead portion using the temporary coding condition,
   wherein said first coding unit performs the actual coding of all of the obtained moving picture signal according to the generated coding condition for the actual coding, so as to generate and output the binary data, and
   wherein said second coding unit processes the binary data obtained according to the coding condition for the actual coding, so as to output the variable coded binary data.

2. The picture coding apparatus according to claim 1,
   wherein said moving picture obtaining unit obtains the moving picture signal, which comprises a plurality of pictures, by sequentially obtaining each picture of the plurality of pictures,
   wherein the lead portion of the moving picture signal includes lead pictures of the plurality of pictures, and
   wherein said first coding unit temporarily codes the lead pictures included in the lead portion, in a period when the actual coding is not to be performed on the plurality of pictures obtained by said moving picture obtaining unit.

3. The picture coding apparatus according to claim 1, wherein, in said first coding unit, a lead picture reference relationship, which is used in the temporary coding of a lead picture corresponding to the lead portion of the moving picture signal, is different from a lead picture reference relationship, which is used in the actual coding of the lead picture.

4. A picture coding method for coding a moving picture signal via a picture coding apparatus, said picture coding method comprising:

obtaining, via a moving picture obtaining unit, the moving picture signal;

detecting, via a lead detecting unit, a lead portion of the moving picture signal;

performing, via a first coding unit, temporary coding of the detected lead portion of the moving picture signal extending up to a generation of binary data, the temporary coding being performed on the detected lead portion using a temporary coding condition;

generating, via a coding condition generating unit, a coding condition for actual coding, the coding condition for the actual coding being based on the first coding condition used in said performing of the temporary coding of the detected lead portion;

performing, via the first coding unit, actual coding of all of the obtained moving picture signal according to the generated coding condition for the actual coding, so as to generate the binary data; and performing, via a second coding unit, at least variable-length coding on the generated binary data, so as to output variable-length coded binary data.

* * * * *